(12) United States Patent
Yang et al.

(10) Patent No.: US 12,009,487 B2
(45) Date of Patent: Jun. 11, 2024

(54) SLAVE BATTERY MANAGEMENT SYSTEM AT A BOUNDARY OF METAL HOUSING AND BATTERY SYSTEM INCLUDING THE SAME

(71) Applicant: LG ENERGY SOLUTION, LTD., Seoul (KR)

(72) Inventors: Seong Yeol Yang, Daejeon (KR); Ji Won Hwang, Daejeon (KR); Yean Sik Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 335 days.

(21) Appl. No.: 17/311,932

(22) PCT Filed: Jan. 31, 2020

(86) PCT No.: PCT/KR2020/001512
§ 371 (c)(1),
(2) Date: Jun. 8, 2021

(87) PCT Pub. No.: WO2020/159300
PCT Pub. Date: Aug. 6, 2020

(65) Prior Publication Data
US 2022/0029204 A1    Jan. 27, 2022

(30) Foreign Application Priority Data
Feb. 1, 2019    (KR) .................. 10-2019-0013793

(51) Int. Cl.
*H01M 10/42* (2006.01)
*H01M 50/204* (2021.01)
(Continued)

(52) U.S. Cl.
CPC ..... *H01M 10/425* (2013.01); *H01M 10/4207* (2013.01); *H01M 50/204* (2021.01);
(Continued)

(58) Field of Classification Search
CPC ........... H01M 10/425; H01M 10/4207; H01M 50/204; H01M 50/224; H01M 2010/4271;
(Continued)

(56) References Cited

U.S. PATENT DOCUMENTS 6,236,649 B1    5/2001    Jun
9,564,762 B2    2/2017    Lee et al.
(Continued)

FOREIGN PATENT DOCUMENTS

EP    3 582 318 A1    12/2019
JP    2004-007411 A    1/2004
(Continued)

OTHER PUBLICATIONS

Office Action dated Jun. 28, 2022 issued by the Japanese Patent Office in corresponding Japanese Patent Application No. 2021-532875.
(Continued)

*Primary Examiner* — Richard Isla
*Assistant Examiner* — Manuel Hernandez
(74) *Attorney, Agent, or Firm* — Morgan, Lewis & Bockius LLP

(57) ABSTRACT

A battery system includes a battery pack having a metal housing capable of accommodating a plurality of battery modules, a plurality of slave battery management systems configured to manage the plurality of battery modules, and a master battery management system installed outside the metal housing to wirelessly communicate with a first battery management system among the plurality of slave battery management systems, wherein the first slave battery management system which communicates with the master battery management system is installed at a boundary of the metal housing so as not to be shielded with the metal housing.

18 Claims, 9 Drawing Sheets

(51) Int. Cl.
*H01M 50/224* (2021.01)
*H02J 7/00* (2006.01)
*B60L 58/18* (2019.01)
*H04B 1/713* (2011.01)
*H04B 1/715* (2011.01)

(52) U.S. Cl.
CPC ....... *H01M 50/224* (2021.01); *H02J 7/00032* (2020.01); *B60L 58/18* (2019.02); *H01M 2010/4271* (2013.01); *H01M 2010/4278* (2013.01); *H01M 2220/20* (2013.01); *H02J 7/0013* (2013.01); *H04B 1/713* (2013.01); *H04B 1/715* (2013.01); *H04B 2001/7154* (2013.01)

(58) Field of Classification Search
CPC ....... H01M 2010/4278; H01M 2220/20; H02J 7/00032; H02J 7/0013; B60L 58/18; H04B 1/713; H04B 1/715; H04B 2001/7154
USPC .................................. 320/112; 429/90, 163
See application file for complete search history.

(56) References Cited

U.S. PATENT DOCUMENTS

| | | | |
|---|---|---|---|
| 2005/0126275 | A1 | 6/2005 | Lin |
| 2008/0094222 | A1 | 4/2008 | Kaoru |
| 2010/0019732 | A1 | 1/2010 | Utsumi et al. |
| 2011/0127962 | A1 | 6/2011 | Murao et al. |
| 2011/0175574 | A1 | 7/2011 | Sim et al. |
| 2013/0271072 | A1 | 10/2013 | Lee et al. |
| 2014/0285156 | A1 | 9/2014 | Mukaitani et al. |
| 2014/0306667 | A1 | 10/2014 | Mukaitani et al. |
| 2014/0312915 | A1 | 10/2014 | Mukaitani et al. |
| 2016/0056510 | A1 | 2/2016 | Takeuchi et al. |
| 2016/0268642 | A1* | 9/2016 | Yamazoe ............ H01M 10/425 |
| 2016/0294019 | A1 | 10/2016 | Yamauchi et al. |
| 2018/0012484 | A1* | 1/2018 | Sakabe ................ G08C 25/00 |
| 2019/0237816 | A1 | 8/2019 | Kim et al. |
| 2019/0242949 | A1 | 8/2019 | Lemkin et al. |
| 2020/0006815 | A1 | 1/2020 | Hwang et al. |
| 2020/0064408 | A1 | 2/2020 | Sato |
| 2022/0305951 | A1* | 9/2022 | Shigemori .......... H02J 7/00032 |

FOREIGN PATENT DOCUMENTS

| | | | | |
|---|---|---|---|---|
| JP | 2006-148289 | A | | 6/2006 |
| JP | 2006148289 | A | * | 6/2006 |
| JP | 2010-142083 | A | | 6/2010 |
| JP | 2011-034964 | A | | 2/2011 |
| JP | 2011-115015 | A | | 6/2011 |
| JP | 2013-541320 | A | | 11/2013 |
| JP | 2016-012954 | A | | 1/2016 |
| JP | 2016012954 | A | * | 1/2016 |
| JP | 2018-073691 | A | | 5/2018 |
| JP | 2019061872 | A | * | 4/2019 |
| JP | 6514694 | B2 | * | 5/2019 ............... H02J 7/00 |
| JP | 2020-501482 | A | | 1/2020 |
| KR | 10-0217727 | B1 | | 9/1999 |
| KR | 10-0637551 | B1 | | 10/2006 |
| KR | 10-2010-0097504 | A | | 9/2010 |
| KR | 10-2011-0013747 | A | | 2/2011 |
| KR | 10-1205997 | B1 | | 11/2012 |
| KR | 10-2013-0101457 | A | | 9/2013 |
| KR | 10-2014-0007599 | A | | 1/2014 |
| KR | 10-2014-0015273 | A | | 2/2014 |
| KR | 10-2014-0083450 | A | | 7/2014 |
| KR | 10-1553351 | B1 | | 9/2015 |
| KR | 10-2017-0050628 | A | | 5/2017 |
| KR | 10-2018-0079769 | A | | 7/2018 |
| KR | 10-2019-0009635 | A | | 1/2019 |
| WO | 2008/056509 | A1 | | 5/2008 |
| WO | 2013/139921 | A2 | | 9/2013 |
| WO | 2014/103008 | A1 | | 7/2014 |
| WO | WO-2014156264 | A1 | * | 10/2014 ......... G01R 31/3658 |
| WO | 2015/083208 | A1 | | 6/2015 |
| WO | 2015/189898 | A1 | | 12/2015 |
| WO | WO-2015189898 | A1 | * | 12/2015 ............... H02J 7/00 |
| WO | 2016/128160 | A1 | | 8/2016 |
| WO | WO-2016121644 | A1 | * | 8/2016 ............. G08C 17/00 |
| WO | 2018/005631 | A1 | | 1/2018 |
| WO | 2018/083949 | A1 | | 5/2018 |
| WO | WO-2019026591 | A1 | * | 2/2019 ............. G08C 17/02 |
| WO | WO-2022019481 | A1 | * | 1/2022 ........... G01R 31/371 |
| WO | WO-2022059922 | A1 | * | 3/2022 ........ H01M 10/4207 |

OTHER PUBLICATIONS

Notification of Third Party Observation (1) issued on Feb. 15, 2023, in corresponding European Patent Application No. 20749399.0.
Notification of Third Party Observation (2) issued on Feb. 28, 2023, in corresponding European Patent Application No. 20749399.0.
Notification of Third Party Observation (3) issued on Mar. 1, 2023, in corresponding European Patent Application No. 20749399.0.
International Search Report (with partial translation) and Written Opinion issued in corresponding International Patent Application No. PCT/KR2020/001512, dated May 8, 2020.
Notification of Third Party Observation, dated Apr. 20, 2023, in corresponding European Patent Application No. 20749399.0.
Extended European Search Report dated Jan. 4, 2022 issued by the European Patent Office in corresponding European Patent Application No. 20749399.0.
Office Action dated Dec. 22, 2022, issued in corresponding Korean Patent Application No. 10-2019-0013793.
Office Action dated Sep. 30, 2023, issued in corresponding Chinese Patent Application No. 202080007818.X (Note: JP 2006-148289 A and JP 2010-142083 A were previously cited in an IDS and/or 892.).
Notification of Third Party Observation dated Apr. 24, 2024, issued in corresponding European Patent Application No. 20749399.0.

* cited by examiner

SLAVE BATTERY MANAGEMENT SYSTEM AT A BOUNDARY OF METAL HOUSING AND BATTERY SYSTEM INCLUDING THE SAME

CROSS-REFERENCE TO RELATED APPLICATIONS

This application claims the benefit of Korean Patent Application No. 10-2019-0013793, filed on Feb. 1, 2019, in the Korean Intellectual Property Office, the disclosure of which is incorporated herein in its entirety by reference.

BACKGROUND OF THE INVENTION

Technical Field

The present invention relates to a battery system and slave battery management system for performing wireless communication between a slave battery management system and a master battery management system.

Description of Related Art

Recently, research and development of secondary batteries has been actively carried out. Here, the secondary batteries, which are rechargeable batteries, represent all of conventional Ni/Cd batteries and Ni/MH batteries and up-to-date lithium ion batteries. The lithium batteries among those secondary batteries have the merit of high energy density compared to the conventional Ni/Cd batteries or Ni/MH batteries. Furthermore, the lithium ion batteries can be made small in size and light in weight, and are thus used as power sources of mobile devices. Moreover, since the scope of use of the lithium ion batteries extend to power sources of electric vehicles, the lithium ion batteries attract attention as next-generation energy storage media.

A secondary battery is typically used as a battery pack including a battery module in which a plurality of battery cells are connected in series or in parallel. The state and operation of the battery pack are managed and controlled by a battery management system (BMS).

The battery management system of a battery system including a plurality of battery packs may include a master battery management system and a plurality of slave battery management systems. The master battery management system communicates with an upper-level system to control the operation of the plurality of slave battery management systems.

Recently, such a master battery management system and a plurality of slave battery management systems wirelessly transmit/receive signals. However, when performing wireless communication between a master battery management system and a slave battery management system in a vehicle battery management system, the communication may be unstable if a line of sight (LOS) is not secured between the master battery management system and the slave battery management system. Furthermore, when the master battery management system or the slave battery management system is shielded with a metal material, wireless communication therebetween may be unstable.

BRIEF SUMMARY OF THE INVENTION

Technical Problem

An object of the present invention is to smoothly perform wireless communication between a master battery management system and a slave battery management system when implementing a wireless communication BMS in which a LOS cannot be secured or a shielding metal material is present between the master battery management system and the slave battery management system.

Technical Solution

According to an aspect of the present invention, there is provided a battery system including: a battery pack having a metal housing capable of accommodating a plurality of battery modules; a plurality of slave battery management systems configured to manage the plurality of battery modules; and a master battery management system installed outside the metal housing to wirelessly communicate with a first battery management system among the plurality of slave battery management systems, wherein the first slave battery management system which communicates with the master battery management system is installed at a boundary of the metal housing so as not to be shielded with the metal housing.

In the battery system according to an embodiment of the present invention, a plurality of other slave battery management systems other than the first slave battery management system are arranged and shielded in the metal housing.

In the battery system according to an embodiment of the present invention, a first antenna for wirelessly communicating with the plurality of slave battery management systems arranged in the metal housing is installed in a portion of the first slave battery management system, which is arranged in the metal housing, and a second antenna for wirelessly communicating with the master battery management system is installed in a portion of the slave battery management system, which is arranged outside the metal housing.

In the battery system according to an embodiment of the present invention, the first slave battery management system communicates with the plurality of other slave battery management systems arranged in the metal housing through a channel selected by frequency hopping.

In the battery system according to an embodiment of the present invention, the first slave battery management system communicates with the master battery management system through a single channel or a channel selected by frequency hopping.

In the battery system according to another embodiment of the present invention, the first slave battery management system communicates with the plurality of other slave battery management systems arranged in the metal housing through a single channel, and communicates with the master battery management system through a channel selected by frequency hopping.

The battery system according to an embodiment or another embodiment of the present invention is installed in a vehicle.

According to another aspect of the present invention, there is provided a slave battery management system included in a battery pack having a metal housing capable of accommodating a plurality of battery modules, the slave battery management system including: a first communication unit configured to receive a signal from a plurality of other slave battery management systems arranged in the metal housing; a second communication unit configured to receive a signal from a master battery management unit arranged outside the metal housing; a communication control unit configured to individually control the first communication unit and the second communication unit so that the second communication unit transmits a signal received from the plurality of other slave battery management systems to the master battery management system and the first communication unit transmits a signal received from the master battery management system to at least one of the plurality of other slave battery management systems; and a battery management unit configured to manage at least one of the plurality of battery modules, wherein the slave battery management system is installed at a boundary of the metal housing.

In the slave battery management system according to an embodiment of the present invention, the communication control unit controls so as to transmit/receive a signal to/from the plurality of other slave battery management systems through a channel selected by frequency hopping.

In the slave battery management system according to an embodiment of the present invention, the communication control unit controls so as to transmit/receive a signal to/from the master battery management system through a single channel or a channel selected by frequency hopping.

In the slave battery management system according to another embodiment of the present invention, the communication control unit controls so as to communicate with the plurality of other slave battery management systems through a single channel and communicate with the master battery management system through a channel selected by frequency hopping.

In the slave battery management system according to an embodiment of the present invention, a first antenna for wirelessly transmitting/receiving a signal to/from the plurality of other slave battery management systems arranged in the metal housing is installed as the first communication unit in a portion of the slave battery management system, which is arranged in the metal housing, and a second antenna for wirelessly transmitting/receiving a signal to/from the master battery management system is installed as the second communication unit in a portion of the slave battery management system, which is arranged outside the metal housing.

In the slave battery management system according to an embodiment of the present invention, the plurality of other slave battery management systems arranged in the metal housing are capable of communicating with the master battery management system only via the slave battery management system.

In the slave battery management system according to an embodiment of the present invention, the slave battery management system is mounted in a vehicle.

According to another aspect of the present invention, there is provided a communication method by a slave battery management system installed at a boundary of a metal housing of a battery pack, the metal housing accommodating a plurality of battery modules, the communication method including the steps of: measuring a state of at least one of the plurality of battery modules; transmitting/receiving a signal to/from each of a plurality of other slave battery management systems installed in the metal housing; and transmitting/receiving a signal to/from a master battery management system installed outside the metal housing, wherein when transmitting a signal to the master battery management system, a signal received from the plurality of other slave battery management systems and a signal related to the measured state are transmitted together.

In the communication method according to an embodiment of the present invention, in the step of transmitting/receiving a signal to/from each of the plurality of other slave battery management systems, the signal is transmitted/received to/from the plurality of other slave battery management systems through a channel selected by frequency hopping.

In the communication method according to an embodiment of the present invention, in the step of transmitting/receiving a signal to/from the master battery management system, the signal is transmitted/received to/from the master battery management system through a single channel or a channel selected by frequency hopping.

In the communication method according to another embodiment of the present invention, in the step of transmitting/receiving a signal to/from each of the plurality of other slave battery management systems, the signal is transmitted/received to/from the plurality of other slave battery management systems through a single channel, and, in the step of transmitting/receiving a signal to/from the master battery management system, the signal is transmitted/received through a channel selected by frequency hopping.

Advantageous Effects

According to the present invention, even when a slave battery management system is shielded with a metal housing, the slave battery management system can stably perform wireless communication with a master battery management system without an additional configuration.

Furthermore, wireless communication which is robust against external signal interference can be performed between the slave battery management system and the master battery management system of the present invention by using frequency hopping.

DETAILED DESCRIPTION OF THE INVENTION

Figure 1:
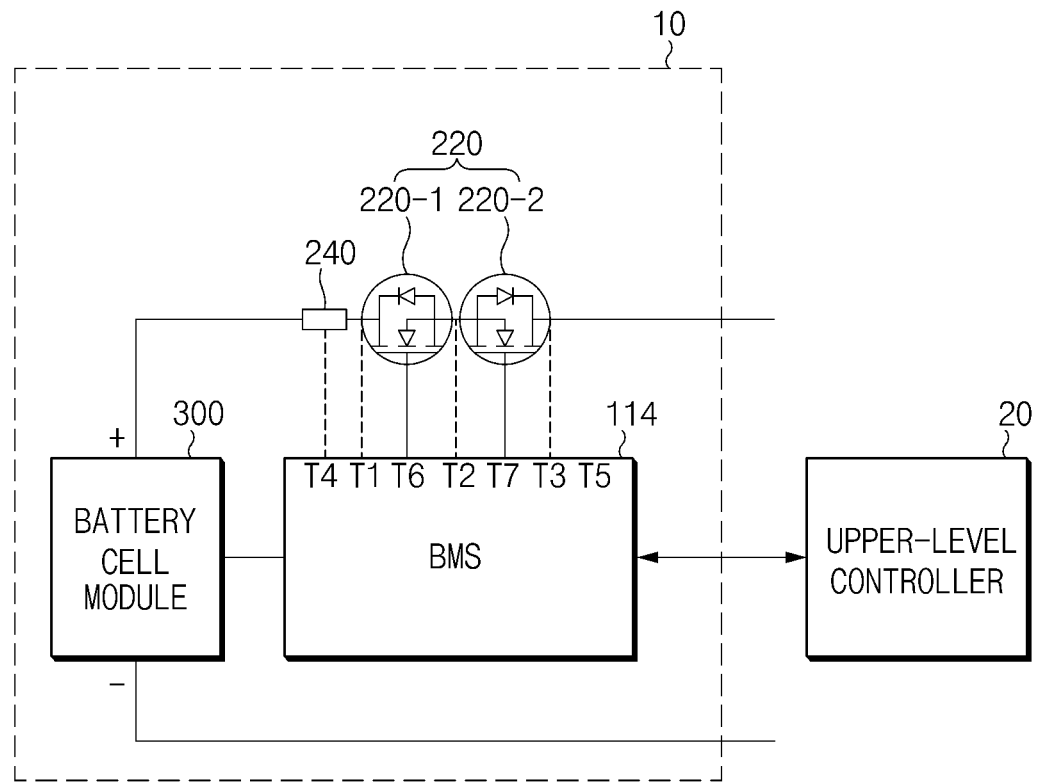
FIG. 1 is a block diagram illustrating a configuration of a battery control system.

Hereinafter, various embodiments of the present invention will be described in detail with reference to the accompanying drawings. However, it should be understood that the present invention is not limited to specific embodiments, but rather includes various modifications, equivalents and/or alternatives of various embodiments of the present invention. Regarding description of the drawings, like reference numerals may refer to like elements.

The terminology used herein is only used for describing specific embodiments and is not intended to limit the scope of other embodiments. The terms of a singular form may include plural forms unless otherwise specified. The terms used herein, including technical or scientific terms, have the same meanings as understood by those skilled in the art. Commonly-used terms defined in a dictionary may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

The terms "first", "second", "A", "B", "(a)", "(b)" and the like may be used herein to describe elements of the embodiments of the present invention. However, the terms are only used to distinguish one element from other elements, and the attributes or order of the elements are not limited by the terms. It will be understood that when an element is referred to as being "connected" or "coupled" to another element, it can be directly connected or coupled to the other element, or intervening elements may be present.

FIG. 1 is a configuration diagram schematically illustrating a battery control system including a battery pack 10 and an upper-level controller 2 included in an upper-level system according to an embodiment of the present invention.

As illustrated in FIG. 1, the battery pack 10 includes a battery module 300 including at least one battery cell and capable of being charged/discharged, a switching unit 220 connected in series to a positive terminal side or negative terminal side of the battery module 300 to control a charging/discharging current flow of the battery module 300, and a battery management system (BMS) 114, which monitors a voltage, current, temperature, and the like of the battery pack 10 to prevent overcharge and overdischarge.

Here, the switching unit 220 may use a semiconductor switching element for controlling a current flow for charging or discharging the battery module 300, for example, at least one MOSFET. In detail, the switching unit 220 may include a charging switching element 220-1, which is controlled to be on at the time of charging, and a discharging switching element 220-2, which is controlled to be on at the time of charging. However, this is merely an example, and thus, the switching unit 220 is not limited to a MOSFET, and a relay or the like may be used instead.

Furthermore, the BMS 114 may measure or calculate a voltage and current of a gate, source, and drain of the semiconductor switching element to monitor the voltage, current, temperature, and the like of the battery pack 10, and may measure the current of the battery pack using a current sensor 240 arranged adjacent to the semiconductor switching element. The BMS 114 may include, as an interface for receiving an input of measurement values of the above-described various parameters, a plurality of terminals T1-T5 and a circuit connected to the terminals to process input values.

Furthermore, the BMS 114 may connect terminals T6 and T7 to a gate terminal of each MOSFET to control ON/OFF of the MOSFET, and may be connected to the battery module 300 to monitor a state of the battery module 300.

Since the configuration of the battery pack 10 and the configuration of the BMS 114 described above are known, more detailed descriptions are not provided.

Furthermore, the BMS 114 according to embodiments of the present invention may be connected to the upper-level controller 20. Operation of the BMS 114 may be controlled on the basis of a signal applied from the upper-level controller 20.

Hereinafter, a method of communication between the battery management system 114 and another battery management system will be described in detail.

Figure 2:
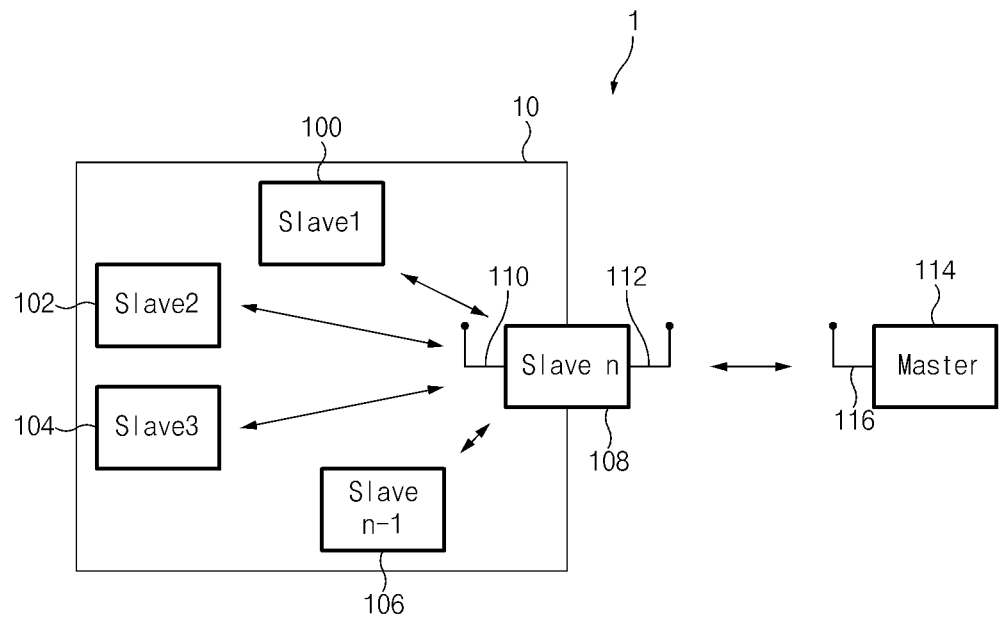
FIG. 2 is a configuration diagram illustrating a battery system according to an embodiment of the present invention.

FIG. 2 is a configuration diagram illustrating a battery system 1 according to an embodiment of the present invention.

The battery system 1 includes the battery pack 10 including a plurality of slave battery management systems 100 to 108, and a master battery management system 114.

To manage a state and performance of a battery, when the master battery management system 114 receives an operation command from an upper-level control unit, the master battery management unit 114 transmits an operation command signal to a slave battery management system that is a lower-level battery management system. The operation command signal includes all signals related to the state and performance of a battery. The slave battery management system which has received the operation command signal performs an operation for a battery module being managed, for example, battery charging/discharging, battery state check, or the like. Furthermore, when the slave battery management system has performed the battery state check or the like, the slave battery management system transmits data related to the battery state check to the master battery management system.

The plurality of slave battery management systems 100 to 108 manage a plurality of battery modules. One slave battery management system 108 among the plurality of slave battery management systems is installed at a boundary of a metal housing of the battery pack 10.

Furthermore, the other slave battery management systems among the plurality of slave battery management systems are installed in the metal housing of the battery pack 10.

The slave battery management systems 100 to 106 installed in the metal housing are shielded, and thus it is difficult for the slave battery management systems 100 to 106 to directly wirelessly communicate with the master battery management system 114.

Therefore, the one slave battery management system 108 among the plurality of slave battery management systems is installed at a boundary of the metal housing to serve as a relay for performing wireless communication between the other slave battery management systems 100 to 106 and the master battery management system 114.

In detail, the slave battery management system 108 is installed at a boundary of the metal housing of the battery pack 10 so that a first portion of the slave battery management system 108 is disposed in the metal housing, and a second portion of the slave battery management system 108 is disposed outside the metal housing.

Accordingly, since the slave battery management system 108 installed at a boundary of the metal housing of the battery pack 10 is not shielded by the metal housing, the slave battery management system 108 may transmit/receive signals through wireless communication with the other slave battery management systems 100 to 106 arranged in the metal housing, and may also transmit/receive signals through wireless communication with the master battery management system 114 arranged outside the metal housing.

The slave battery management system 108 installed at a boundary of the metal housing of the battery pack 10 includes a first antenna 110, which is installed in the first portion arranged in the housing to wirelessly transmit/receive signals to/from the other slave battery management systems 100 to 106.

Furthermore, the slave battery management system 108 installed at a boundary of the metal housing of the battery pack 10 includes a second antenna 112, which is installed in the second portion arranged outside the housing to wirelessly transmit/receive signals to/from the master battery management system 114.

The slave battery management system 108 receives, from the other slave battery management systems 100 to 106, a signal through a channel selected by frequency hopping.

In detail, the slave battery management system 108 receives or transmits a signal from/to the slave battery management system 100 by performing frequency hopping for a short time using a predetermined first hopping code. Here, the hopping code is a code set to transmit/receive signals while changing a preset frequency according to a preset time between two devices which transmit/receive signals.

Furthermore, the slave battery management system 108 receives or transmits a signal from/to the slave battery management system 102 by performing frequency hopping for a short time using a predetermined second hopping code.

Furthermore, the slave battery management system 108 receives or transmits a signal from/to the slave battery management system 104 by performing frequency hopping for a short time using a predetermined third hopping code.

Furthermore, the slave battery management system 108 receives or transmits a signal from/to the slave battery management system 106 by performing frequency hopping for a short time using a predetermined nth hopping code.

The first to nth hopping codes are set in advance so as to prevent frequencies from overlapping at the same time.

As described above, the slave battery management system 108 may use frequency hopping when transmitting/receiving signals to/from the other slave battery management systems 100 to 106 arranged in the metal housing so as to perform communication that is robust against external interference.

Furthermore, the slave battery management system 108 transmits signals received from each of the slave battery management systems 100 to 106 via a channel selected by frequency hopping to the master battery management system 114 via a single channel or a channel selected by frequency hopping. Here, an operation of transmitting signals from the slave battery management system 108 to the master battery management system 114 may be performed at a frequency that is different from a frequency used for communication between the slave battery management system 108 and the other slave battery management systems 100 to 106. Alternatively, the operation of transmitting signals from the slave battery management system 108 to the master battery management system 114 may be performed at a timing that is different from a signal transmission timing between the slave battery management system 108 and the other slave battery management systems 100 to 106. Data packets of a signal transmitted from the slave battery management system 108 to the master battery management system 114 may be the same as data packets transmitted from the other slave battery management systems 100 to 106 to the slave battery management system 108, and vice versa.

That is, even when the master battery management system 114 transmits various signals such as an operation command signal and the like to the slave battery management systems 100 to 106, the slave battery management systems 100 to 106 may be unable to receive the signals from the master battery management system 114 due to shielding by the metal housing, communication shadow, or the like. Therefore, the slave battery management system 108 may receive, from the master battery management system 114, a signal through a single channel or a channel selected by frequency hopping. The slave battery management system 108 which has received a signal from the master battery management system 114 may use each of the first hopping code to the nth hopping code to transmit signals to the other slave battery management systems 100 to 106 through a channel selected by frequency hopping. Likewise, an operation of transmitting signals from the slave battery management system 108 to the other slave battery management systems 100 to 106 may be performed at a frequency that is different from a frequency at which the master battery management system 114 transmits signals to the slave battery management system 108. Alternatively, the operation of transmitting signals from the slave battery management system 108 to the other slave battery management systems 100 to 106 may be performed at a timing that is different from a signal transmission timing between the slave battery management system 108 and the master battery management system 114. Furthermore, data packets of a signal transmitted from the slave battery management system 108 to the other slave battery management systems 100 to 106 may be the same as data packets transmitted from the master battery management system 114 to the slave battery management system 108.

However, the slave battery management system 108 and the plurality of slave battery management systems 100 to 106 arranged in the metal housing of the battery pack 10 may be implemented so as to transmit/receive signals through a single channel, considering that interference by an external channel is low due to shielding by metal. Therefore, since communication is performed through a single channel in the metal housing, implementation of this configuration is easy.

However, even in this case, signals are transmitted/received through a channel selected by frequency hopping between the slave battery management system 108 and the master battery management system 114 in order to prevent interference by other signals.

The battery system described above may be mounted, for example, in a vehicle. That is, the battery system may be a vehicle battery system.

Figure 3:
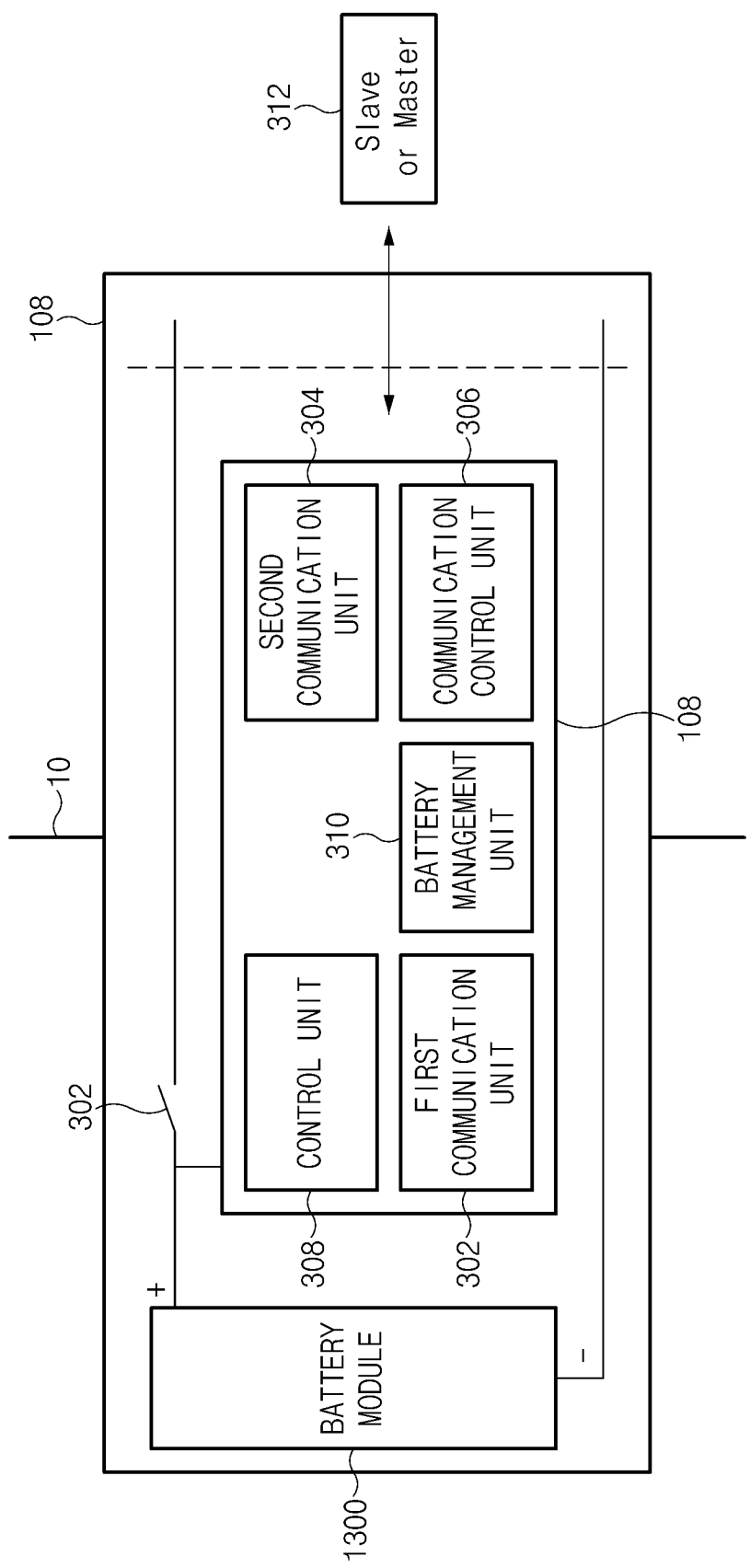
FIG. 3 is a configuration diagram illustrating a slave battery management system according to an embodiment of the present invention.

FIG. 3 is a configuration diagram illustrating the slave battery management system 108 according to an embodiment of the present invention.

The slave battery management system 108 includes a first communication unit 302, a second communication unit 304, a communication control unit 306, a control unit 308, and a battery management unit 310.

A signal is received from the plurality of slave battery management systems 100 to 106 arranged in the metal housing of the battery pack 10 via the first communication unit 302.

The first communication unit 302 receives a signal through a channel selected by preset frequency hopping from the plurality of slave battery management systems 100 to 106 arranged in the metal housing.

For example, the first communication unit 302 receives a signal from the slave battery management system 100 by performing frequency hopping for a short time using a predetermined first hopping code.

Furthermore, the first communication unit 302 receives a signal from the slave battery management system 102 by performing frequency hopping for a short time using a predetermined second hopping code.

Furthermore, the first communication unit 302 receive a signal from the slave battery management system 104 by performing frequency hopping for a short time using a predetermined third hopping code.

Furthermore, the first communication unit 302 receives a signal from the slave battery management system 106 by performing frequency hopping for a short time using a predetermined nth hopping code.

The first to nth hopping codes are set in advance so as to prevent frequencies from overlapping at the same time.

The second communication unit 304 receives, from the master battery management system 114, a signal through a single channel or a channel selected by frequency hopping.

The first communication unit 302 transmits signals received from each of the plurality of slave battery management systems 100 to 106 via a channel selected by frequency hopping to the master battery management system 114 via a single channel or a channel selected by frequency hopping.

Furthermore, the second communication unit 304 transmits a signal received from the master battery management system 114 through a single channel or a channel selected by frequency hopping to at least one of the plurality of slave battery management systems 100 to 106 through a channel selected by frequency hopping.

The communication control unit 306 controls the first communication unit 302 so as to transmit/receive signals to/from the plurality of slave battery management systems 100 to 106 arranged in the metal housing through a channel selected by frequency hopping using a preset hopping code.

Furthermore, the communication control unit 306 controls the second communication unit 304 so as to transmit/receive signals to/from the master battery management system 114 through a single channel or a channel selected by frequency hopping.

The communication control unit 306 may individually control the first communication unit 302 and the second communication unit 304. That is, the communication control unit 306 may individually perform communication between the first communication unit 302 and the plurality of slave battery management systems 100 to 106 and communication between the second communication unit 304 and the master battery management system 114. In other words, operation of the first communication unit 302 and operation of the second communication unit 304 may be performed simultaneously or at different timings.

The first communication unit 302 may also receive a signal from the plurality of slave battery management systems 100 to 106 arranged in the metal housing through a single channel.

In this case, the second communication unit 304 may receive a signal from the master battery management system 114 arranged outside the metal housing through a channel selected by frequency hopping.

Furthermore, the second communication unit 304 may transmit a signal received from the plurality of slave battery management systems 100 to 106 arranged in the metal housing through a single channel to the master battery management system 114 arranged outside the metal housing through a channel selected by frequency hopping.

Furthermore, the first communication unit 302 may transmit a signal received from the master battery management system 114 arranged outside the metal housing through a channel selected by frequency hopping to at least one of the plurality of slave battery management systems 100 to 106 arranged in the metal housing through a single channel.

The control unit 308 controls each of the first communication unit 302, the second communication unit 304, the communication control unit 306, and the battery management unit 310.

The battery management unit 310 manages at least one of a plurality of battery modules.

Figure 4:
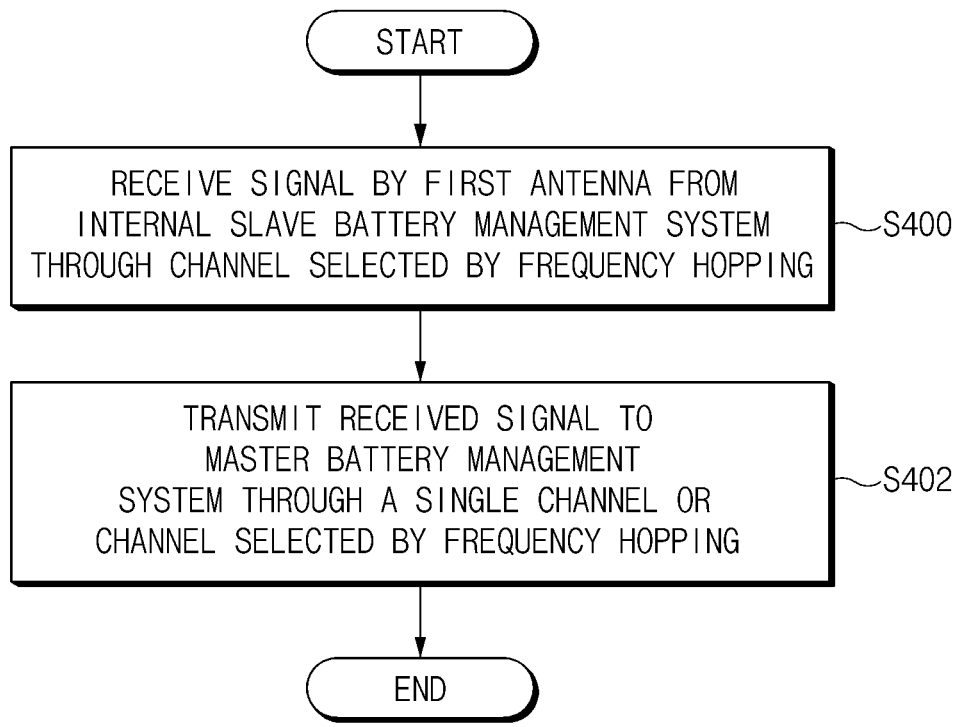
FIG. 4 is a flowchart illustrating a communication method according to an embodiment of the present invention.

FIG. 4 is a flowchart illustrating a communication method according to an embodiment of the present invention.

A signal is received by the first antenna 110 from the plurality of slave battery management systems 100 to 106 arranged in the metal housing of the battery pack 10 through a channel selected by frequency hopping (S400).

The second antenna 112 transmits a received signal to the master battery management system 114 through a single channel or a channel selected by frequency hopping (S402).

Although not illustrated, the same signal delivery may be performed in the case where signals are transmitted from the master battery management system 114 to the slave battery management systems 100 to 106.

A signal is received by the second antenna 112 from the master battery management system 114 arranged outside the metal housing of the battery pack 10 through a single channel or a channel selected by frequency hopping.

The first antenna 110 transmits a received signal to at least one of the plurality of slave battery management systems 100 to 106 arranged in the metal housing through a channel selected by frequency hopping.

Figure 5:
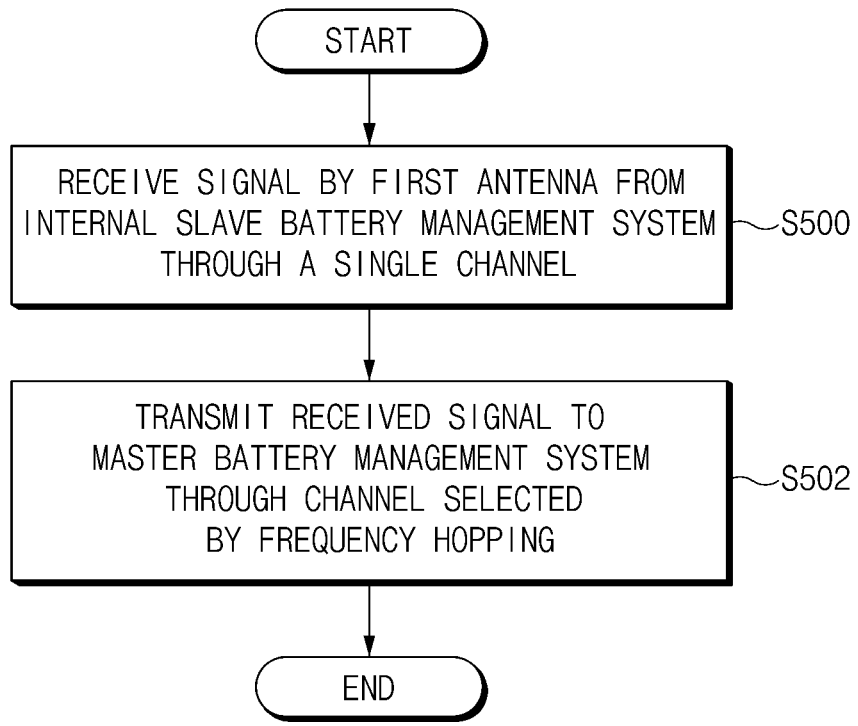
FIG. 5 is a flowchart illustrating a communication method according to another embodiment of the present invention.

FIG. 5 is a flowchart illustrating a communication method according to another embodiment of the present invention.

A signal is received by the first antenna 110 from the plurality of slave battery management systems 100 to 106 arranged in the metal housing of the battery pack 10 through a single channel (S500).

The second antenna 112 transmits a received signal to the master battery management system 114 through a channel selected by frequency hopping (S502).

Although not illustrated, the same signal delivery may be performed in the case where signals are transmitted from the master battery management system 114 to the slave battery management systems 100 to 106.

A signal is received by the second antenna 112 from the master battery management system 114 arranged outside the metal housing of the battery pack 10 through a channel selected by frequency hopping.

The first antenna 110 transmits a received signal to at least one of the plurality of slave battery management systems 100 to 106 arranged in the metal housing through a single channel.

Although FIGS. 4 and 5 illustrate an operation of transmitting signals from the slave battery management systems 100 to 106 arranged in the housing to the master battery management system 114 via the slave battery management system 108, an embodiment is not limited thereto. Those skilled in the art could clearly understand that the master battery management system 114 may transmit a signal to the other slave battery management systems 100 to 106 arranged in the housing via the slave battery management system 108, even when the master battery management system 114 transmits a signal to the slave battery management systems 100 to 108 as described above with reference to FIG. 3.

Figure 6:
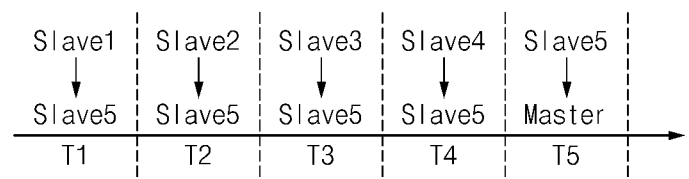
FIG. 6 schematically illustrates a communication sequence over time between a slave battery management system, another slave battery management system, and a master battery management system with regard to a communication method according to an embodiment of the present invention.

FIG. 6 schematically illustrates a communication sequence over time between a slave battery management system, another slave battery management system, and a master battery management system with regard to a communication method according to an embodiment of the present invention.

With regard to the slave battery management system 108, a channel through which a signal is received may be differently set for each time. Furthermore, a channel received from each slave battery management system may also be preset and changed.

Figure 7:
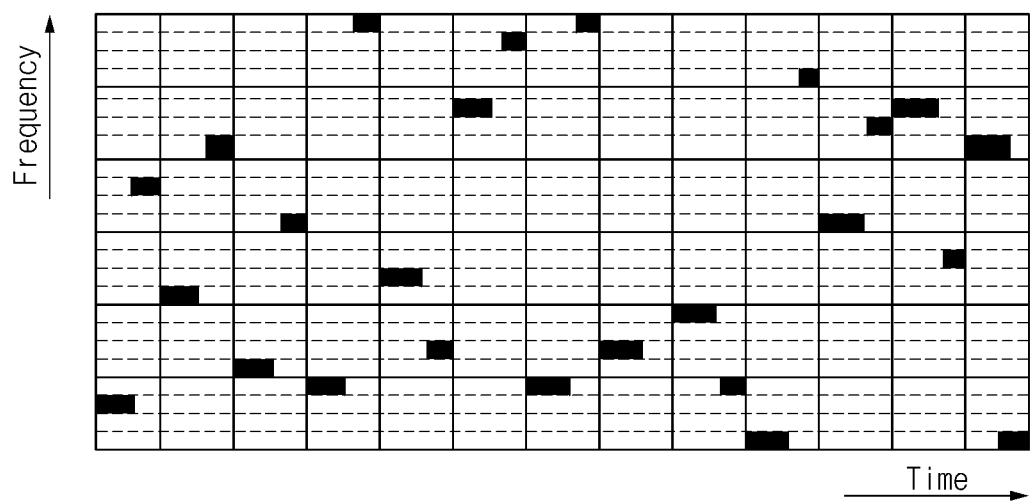
FIG. 7 illustrates an example of a frequency hopping code with regard to a communication method according to an embodiment of the present invention.

FIG. 7 illustrates a frequency hopping code with regard to a communication method according to an embodiment of the present invention.

As illustrated in FIG. 7, signals may be transmitted or received to or from a plurality of slave battery management systems or a master battery management system through a channel selected by frequency hopping using a preset hopping code.

Figure 8:
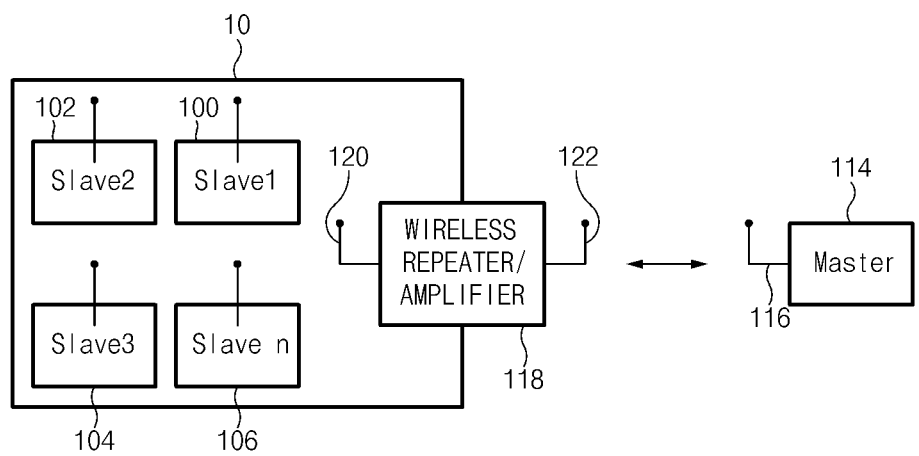
FIG. 8 is a configuration diagram illustrating a battery system according to another embodiment of the present invention.

FIG. 8 is a configuration diagram illustrating a battery system according to another embodiment of the present invention.

The battery system according to the present embodiment has the same configuration as the battery system according to the embodiment illustrated in FIG. 2 except for a relay 118. Thus, descriptions will be provided with a focus on a different configuration.

The relay 118 may be, for example, a repeater or an amplifier. The relay 118 is installed at a boundary of the metal housing of the battery pack 10.

A first portion of the relay 118 is arranged in the metal housing, and a second portion of the relay 118 is arranged outside the metal housing.

Accordingly, since the relay 118 installed at a boundary of the metal housing of the battery pack 10 is not shielded by the metal housing, the relay 118 may transmit/receive signals through wireless communication with the other slave battery management systems 100 to 106 arranged in the metal housing, and may also transmit/receive signals through wireless communication with the master battery management system 114 arranged outside the metal housing.

The relay 118 installed at a boundary of the metal housing of the battery pack 10 includes a first antenna 110, which is installed in the first portion arranged in the housing to wirelessly transmit/receive signals to/from the other slave battery management systems 100 to 106.

Furthermore, the relay 118 installed at a boundary of the metal housing of the battery pack 10 includes a second antenna 122, which is installed in the second portion arranged outside the housing to wirelessly transmit/receive signals to/from the master battery management system 114.

The relay 118 transmits/receives signals to/from the plurality of slave battery management systems 100 to 106 arranged in the metal housing and the master battery management system 114 through a single channel in each case.

An additional relay 118 may be installed to use multiple channels.

Figure 9:
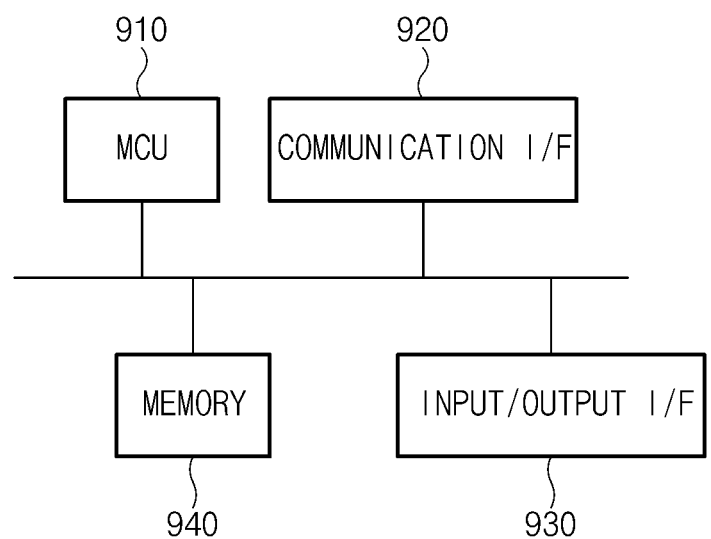
FIG. 9 is a block diagram illustrating a hardware configuration of a battery management system according to an embodiment of the present invention.

FIG. 9 is a block diagram illustrating a hardware configuration of a battery management system according to an embodiment of the present invention.

A battery management system 900 may be provided with a microcontroller (MCU) 910, which controls various processes and each configuration, a memory 940, in which an operating system program and various programs (e.g., a battery pack abnormality diagnosis program or battery pack temperature estimation program) are recorded, an input/output interface 930, which provides an input interface and output interface between a battery cell module and/or semiconductor switching element, and a communication interface 920 capable of communicating with the outside via a wired/wireless communication network. As described above, a computer program according to the present invention may be recorded in the memory 940 and processed by the microcontroller 910 so as to be implemented as a module for executing each of function blocks illustrated in FIG. 3.

A battery pack which directly controls a battery is shielded using a metal housing in order to prevent invasion or interference by an external signal. If the battery pack is shielded with a metal housing, communication in the battery pack may be easier than that outside the battery pack. Therefore, the above-described configuration of the present invention is cost effective in implementing a network technology in the inside of a battery pack, and may prevent external invasion or interference using only a relay or a slave battery management system installed at a boundary of a metal housing.

In the present disclosure, the term "an embodiment" or various modified expressions thereof indicate that specific features, structures, and characteristics related to this embodiment are included in at least one embodiment of the principle of the present invention. Therefore, the term "in an embodiment" and various modified expressions thereof should not be construed as indicating the same embodiment.

All of the embodiments and conditional examples disclosed herein are intended to assist those skilled in the art with understanding the principle and concept of the present invention, and, thus, those skilled in the art could understand that the present invention can be implemented in modified forms without departing from the essential characteristics of the present invention. Therefore, the embodiments disclosed herein should be considered to be not limitative but illustrative. The scope of the present invention should be defined not by the above description but by the claims, and all differences that fall within the same scope as the claims should be construed as being covered by the present invention.

The invention claimed is:

1. A slave battery management system included in a battery pack comprising a metal housing capable of accommodating a plurality of battery modules, the slave battery management system comprising:
   a first communication unit including a first antenna disposed within the metal housing and configured to receive a signal from a plurality of other slave battery management systems arranged in the metal housing;
   a second communication unit including a second antenna disposed outside the metal housing and configured to receive a signal from a master battery management unit arranged outside the metal housing;
   a communication control unit configured to individually control the first communication unit and the second communication unit so that:
      the second communication unit transmits a signal received from the plurality of other slave battery management systems inside the metal housing to the master battery management system outside the metal housing; and
      the first communication unit transmits a signal received from the master battery management system outside the metal housing to at least one of the plurality of other slave battery management systems inside the metal housing; and
   a battery management unit configured to manage a respective battery module corresponding to the slave battery management system among the plurality of battery modules in the metal housing, wherein the slave battery management system is installed partly inside the metal housing and partly outside the metal housing.

2. The slave battery management system of claim 1, wherein the communication control unit is further configured to control the first communication unit to transmit/receive a signal to/from the plurality of other slave battery management systems through a channel selected by frequency hopping.

3. The slave battery management system of claim 2, wherein the communication control unit is further configured to control the second communication unit to transmit/receive a signal to/from the master battery management system through a single channel or a channel selected by frequency hopping.

4. The slave battery management system of claim 1, wherein the communication control unit is further configured to control:
the first communication unit to communicate with the plurality of other slave battery management systems through a single channel; and
the second communication unit to communicate with the master battery management system through a channel selected by frequency hopping.

5. The slave battery management system of claim 1, wherein the plurality of other slave battery management systems, arranged in the metal housing, are capable of communicating with the master battery management system only via the slave battery management system.

6. The slave battery management system of claim 5, wherein the slave battery management system is mounted in a vehicle.

7. The slave battery management system of claim 1, wherein:
the battery management unit is further configured to measure a battery state of the respective battery module corresponding to the slave battery management system; and
the communication control unit is further configured to control the second communication unit to transmit the signal received from the plurality of other slave battery management systems and a signal related to the measured battery state of the respective battery module corresponding to the slave battery management system to the master battery management system outside the metal housing.

8. A communication method by a slave battery management system installed partly inside a metal housing of a battery pack and partly outside the metal housing and including a first antenna inside the metal housing and a second antenna outside the metal housing, the metal housing accommodating a plurality of battery modules, the communication method comprising:
measuring a battery state of at least one of the plurality of battery modules;
transmitting/receiving, via the first antenna inside the metal housing, a signal to/from each of a plurality of other slave battery management systems installed in the metal housing and configured to manage at least one other of the plurality of battery modules; and
transmitting/receiving a signal to/from a master battery management system installed outside the metal housing via the second antenna outside the metal housing,
wherein, in transmitting a signal to the master battery management system, a signal received from the plurality of other slave battery management systems inside the metal housing and a signal related to the measured battery state are transmitted together to the master battery management system outside the metal housing.

9. The communication method of claim 8, wherein, in the operation of transmitting/receiving a signal to/from each of the plurality of other slave battery management systems, the signal is transmitted/received to/from the plurality of other slave battery management systems through a channel selected by frequency hopping.

10. The communication method of claim 9, wherein, in the operation of transmitting/receiving a signal to/from the master battery management system, the signal is transmitted/received to/from the master battery management system through a single channel or a channel selected by frequency hopping.

11. The communication method of claim 8, wherein:
in the operation of transmitting/receiving a signal to/from each of the plurality of other slave battery management systems, the signal is transmitted/received to/from the plurality of other slave battery management systems through a single channel; and
in the operation of transmitting/receiving a signal to/from the master battery management system, the signal is transmitted/received through a channel selected by frequency hopping.

12. A battery system, comprising:
a battery pack comprising a metal housing capable of accommodating a plurality of battery modules;
a plurality of slave battery management systems configured to manage the plurality of battery modules, respectively; and
a master battery management system installed outside the metal housing and configured to wirelessly communicate with a first slave battery management system, among the plurality of slave battery management systems, configured to manage a respective battery module corresponding to the first slave battery management system among the plurality of battery modules,
wherein the first slave battery management system, which is configured to wirelessly communicate with the master battery management system, is installed partly inside the metal housing and partly outside the metal housing so as not to be shielded with the metal housing, and other slave battery management systems among the plurality of battery management systems are disposed within the metal housing, and
wherein the first slave battery management system includes:
a first antenna disposed within the metal housing for wirelessly communicating with the other slave battery management systems in the metal housing; and
a second antenna disposed outside the metal housing for wirelessly communicating with the master battery management system outside the metal housing.

13. The battery system of claim 12, wherein the at least one other slave battery management system is shielded in the metal housing.

14. The battery system of claim 12, wherein the first slave battery management system is further configured to communicate with the other slave battery management systems arranged in the metal housing through a channel selected by frequency hopping.

15. The battery system of claim 14, wherein the first slave battery management system is further configured to communicate with the master battery management system through a single channel or a channel selected by frequency hopping.

16. The battery system of claim 15, wherein the battery system is installed in a vehicle.

17. The battery system of claim 12, wherein the first slave battery management system is further configured to:
- communicate with the other slave battery management systems arranged in the metal housing through a single channel; and
- communicate with the master battery management system through a channel selected by frequency hopping.

18. The battery system of claim 12, wherein the first slave battery management system is further configured to:
- measure a battery state of the respective battery module corresponding to the first slave battery management system; and
- transmit a signal received from at least one of the other slave battery management systems and a signal related to the measured battery state of the respective battery module corresponding to the first slave battery management system to the master battery management system.

* * * * *